Patented Dec. 13, 1949

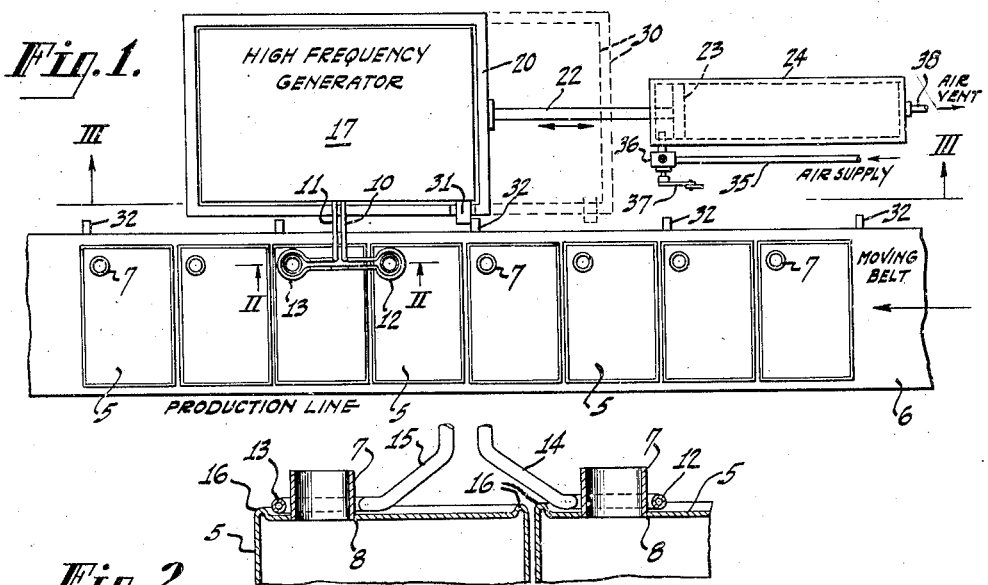

2,491,348

UNITED STATES PATENT OFFICE 2,491,348

INDUCTION HEATING CONVEYER SYSTEM

Gurdon H. Williams, Haddonfield, N. J., assignor to Radio Corporation of America, a corporation of Delaware Application February 24, 1948, Serial No. 10,207

7 Claims. (Cl. 219—47)

The present invention relates to an induction heating conveyor system for use in connection with a production line for the manufacture of articles moving at a predetermined output speed, and has for its primary object to provide an improved method and means for effecting a localized heat treating operation on each of a continuous series of articles or work pieces in a moving production line, without interrupting or stopping the work flow in the line.

It is also an object of the present invention, to provide an improved induction heating system for production line use, in which a series of articles or work pieces may be moved at a continuous rate on a belt or conveyor, and by which a predetermined heating operation may be accomplished in connection with each article or work piece, without changing the output speed of the production line.

More particularly, the invention relates to an induction heating conveyor system for a manufacturing production line moving at a predetermined output speed, wherein it is desirable or necessary to apply heat locally for a short period of time to a predetermined portion of each article, such as a seam or joint requiring soldering or brazing, or an element requiring heat treatment, such as case hardening, while the remainder of the article is maintained at a lower normal temperature. The processing of such articles in the manner referred to, therefore, does not admit of the use of an ordinary heat treating conveyor system in which articles to be processed are passed successively through a heat treating chamber or zone as is well known, since the entire article in such case is subject to the same heat treatment.

It is, therefore, a still further object of the invention, to provide an improved method and means for rapidly heating or heat treating a series of articles or work pieces, which must move continuously while in process through a production line at a desired output speed, whereby each article or work piece to be heated may receive induction heating in a localized area thereof while in motion, without changing the output speed of the production line.

Conveyors of various types used to carry articles or work pieces through a manufacturing production line, must run continuously, rather than with intermittent motion, for greatest efficiency. In many induction heating applications, as in the case where the heating must be localized on the work piece, it is necessary for the work coil or heating electrode to remain in a fixed position relative to the localized area being heated.

In accordance with the invention, however, this type of heating is provided in connection with production line articles and work pieces by maintaining continuous movement of the work as is desirable, while the induction heating unit or work coils and electrodes are arranged for intermittent movement along the conveyor system during the heating cycle, in connection with one or more, and preferably a plurality, of the work pieces.

In accordance with the invention, more specifically, induction heating or heat treating is effectively applied to production line work by causing the work coil or induction heating unit in an improved form and arrangement, to travel intermittently with the work during the heating cycle or operation and to return rapidly to an initial starting position from which it repeats the travel and heating cycle, which is likewise accelerated. The work coil or electrode is caused to remain in a fixed position relative to the portion or localized area of the article or work piece being heat treated, during the heating cycle, without changing the rate of travel of the production line or conveyor system.

Further in accordance with the invention, a multiple heating unit is contemplated for the processing of a plurality of production line articles simultaneously. In this arrangement, the heating unit is moved away from an initial or starting position at the speed of the production line for a required time interval and is provided with means for simultaneously heating several articles in certain localized areas during that interval as required to do the work, whereupon the heating unit is returned to the initial position at a predetermined high speed to meet the next several or group of articles to be heated, and the heating cycle is then repeated with the new group of articles. With this multiple heating arrangement, therefore, effective use of induction heating on a conveyor system for a manufacturing production line may be had. The invention is particularly well adapted for soldering or brazing seams and joints to unite different parts in various articles of manufacture. A present adaptation is to the soldering of spouts on various types of cans which are processed, normally, on long straight conveyor lines which move continuously at the output speed of the can-making machines. The spout soldering is one step in the processing along the conveyor line and is accomplished through use of the invention at continuous high production line speed.

Accordingly, the invention will further be shown and described in its application to the above manufacturing process, and for a further understanding of the invention, attention is now directed to the accompany drawing and following description thereof, and its scope will more particularly be set forth in the appended claims.

In the drawing:

Figure 1 is a plan view of an induction heating conveyor system embodying the invention, as applied to the processing of cans and like articles as above referred to.

Figure 2 is a cross-sectional view, on an enlarged scale, of a portion of Figure 1, taken on section line II—II, and illustrating further details of the invention, and Figure 3 is a view in elevation, and partly in cross-section, of the induction heating conveyor system shown in Figure 1, illustrating further details of the construction and operation thereof.

Referring to the drawing, in which like parts in the several figures are indicated by like reference numerals throughout, a series of articles or work pieces 5, such as rectangular tin cans, are arranged to move uniformly in abutting relation with each other or with any suitable interposed spacer means (not shown), in the direction indicated, continuously and consecutively in a manufacturing production line on a suitable conveyor or belt, indicated at 6, and at a speed determined by a desired rate of flow of the work from the can-making machine (not shown).

At the point in the production line shown in the drawing, each can is provided with a cylindrical pouring spout 7 inserted in the top thereof to extend vertically therefrom, as indicated more clearly in Figure 2. The spout is inserted in the top of each can through an opening 8 therein which tightly fits the cylindrical spout or sleeve and holds it in position for soldering which is applied at the joint during the assembly operation.

Induction heating is applied to the joint, for heating and uniting the parts, by means of an applicator electrode or coil arrangement comprising two high frequency supply conductors 10 and 11 which are connected with two or more heating loops in series as shown at 12 and 13 for example, and as appears more clearly in Figure 1. The conductors are of relatively heavy cross-section and are substantially continuous through the work coils or loops 12 and 13 which are substantially of the same cross-section.

In this manner, the heating loops are rigidly suspended in operative position to lie about the spouts in such close spaced relation to the joints as shown in Figure 2, that effective heating on localized areas of the multiple units is effected as desired. The conductors and loops may be tubular in cross-section, as shown, to provide for the flow of cooling fluid therethrough. In this application, the conductors are bent downwardly as indicated at 14 and 15 to place the heating coils 12 and 13 well below the level of the conductors and, therefore, to clear the beads 16 or other obstructions which may form part of the cans.

High frequency energy is applied to the supply conductors 10 and 11 from a suitable high frequency generator, indicated at 17, enclosed in a casing or container as indicated and supplied with operating current through a flexible supply cable 18, in turn connected with supply leads indicated at 19 and 20. As will hereinafter appear the generator casing operates as a movable carrier for the rigidly positioned work coils and supporting conductors. The generator, per se, may be located at any point remote, if desired, and connected through flexible leads as arranged for the supply cable 18, but is preferably located directly in the casing 17 for direct, short connection with the work coils.

The application of heat to localized areas of continuously moving work pieces in a production line as shown would normally require intermittent stopping of the conveyor system. However, with the present system this is entirely eliminated, as the work coil or coils and carrier move with the production line from a starting position wherein the work coil structure is positioned directly over the desired localized area or areas of one or more articles simultaneously and receives high frequency energy during the travel time whereby the areas are heat treated inductively, and after which the coil structure is released and "leap-frogs" over the line and returns to the starting point to repeat the heating cycle.

To this end, the induction heating work coils or electrodes are caused to move intermittently with the production line or conveyor during the heating operation which normally may require only a few seconds for completion. In the present example, the coils 12 and 13 remain about the spouts of each pair of cans for the few seconds required for melting the solder and uniting the parts thereby. Upon completing the operation the coils are removed from position over the spouts and are moved rearwardly of the conveyor and caused to engage the following pair or group of work pieces in the same manner in a rearward "leap-frog" action. In operation, the work coils start to move at the conveyor speed in a position directly over the can spouts as shown, being then lowered into position, and are raised again after the soldering operation, to return again to the starting position.

For this purpose, the high frequency generator 17 and the connected supply leads 10 and 11, together with the operating coils 12 and 13 are moved and controlled as a unit. As shown more fully in Figure 3, the generator 17 and connected applicator unit as above mentioned, are mounted in a movable carrier or truck 20, which is arranged to move parallel to the conveyor or belt, on suitable rollers 21 under guidance of a control rod 22 connected with a piston 23 which moves in an air cylinder 24, the direction of movement of the control rod 22 and carriage being indicated by the arrows.

The generator and applicator electrodes or coils are likewise movable in a vertical direction, as indicated by the arrows in Figure 3, under control of a solenoid magnet 25, the armature element 26 of which is connected at each end with a toggle lever 27, in turn connected between the bottom of the carriage 20 and a vertically movable floor plate 21 on which the generator 17 is seated, as shown more fully in Figure 3. The floor plate is shown in its lowered position resting against suitable stops 28 provided within the carriage.

In this position, the work coil unit comprising the coils 12 and 13, is lowered and seated in registration with the work about the can spouts, as shown in Fig. 2, for heating the work areas thereof. Operation of the solenoid 25 causes an extension of the toggle connection 27 to raise the floor plate 21 and generator, thereby lifting the work coil unit out of registration with the work a distance sufficient to clear the can spouts and to permit the carriage to move from the advanced or forward position shown in Fig. 1 rearwardly of the production line, to the initial or starting position shown in Fig. 3, or as indicated in Fig. 1 by the dotted lines 30.

It will be noted that the floor plate 21 is provided with a laterally projecting bar 31 which, in the lowered position of the generator and floor plate, may lie in the path of a series of driving studs 32 carried by the moving conveyor 6. By this means, the carriage is moved forwardly along the conveyor belt as any one of the studs 32 engages with the bar 31, causing the carriage to roll forward with the generator and applicator electrodes and thus to follow movement of the conveyor during the heating operation, until the position as shown in Figure 1 is reached. At that point in the forward travel, the electrodes are raised by the lifting of the floor plate and generator under control of the solenoid 25 and toggle connection 27, and the piston 23 is driven rearwardly by the application of air pressure thereto from a pressure supply pipe 35 under control of an air valve 36, which in turn is operated by a control lever 37. The cylinder 24 is provided with a vent pipe indicated at 38 in the rear thereof for permitting the piston to move freely therein under control of the air supply applied thereto as aforesaid.

With the carriage returned to the rearward or initial position as shown in dotted lines 30 of Figure 1 and as shown in Figure 3, the carriage is arranged to cut off the air supply to the cylinder 24 by operation of the valve 37. Any suitable arrangement for the operation of the valve may be provided and in the present example comprises a second solenoid 40 having an armature or plunger 41 connected through a link 42 and connecting a rod 43 with the operating lever 37 of the valve 36.

The solenoid is energized from the supply leads 19 and 20, under control of two switches indicated at 44 and 45, Figure 3, through a circuit which may be traced from the supply lead 20 through the switch 44, thence through a connection lead 46 and a terminal 47, a cable connection 48 for the switch 45, thence through the return terminal 49 to the solenoid 40, and from the solenoid 40 to the other supply conductor 19.

The flexible cable connection 48 for the switch 45 permits the connection to follow movement of the carriage. Likewise, the solenoid 25 is connected through a flexible cable connection 50 and a fixed terminal block 51 with the leads 46 and 19 whereby it may be energized from the supply leads 19 and 20 through switch 44.

The switch 44 is operated by a suitable lever 52 which is connected through an extended link connection 53 with a second lever 54 positioned to be engaged and moved, as shown in Figure 3, by the return movement of the carriage, thereby to throw the switch lever 52 to open the switch 44 and to deenergize the leads 19 and 46, whereby the solenoid armature 26 and toggle connections 27 assume the position shown in Figure 3 and the solenoid plunger or armature 41 is moved under control of a suitable spring 56 to close the valve 36 cutting off the air supply to the cylinder 24 and opening the valve to exhaust.

When the carriage and generator are moving into the extreme forward position shown in Figure 1, and the heating operation is completed, the carriage is arranged to strike and move the switch lever 52 in the remaining distance in the forward direction to close the switch 44, as indicated by the dotted outline 55 in Figure 3, whereupon the solenoid 25 is energized and causes the electrodes 12 and 13 to lift and disengage from the work. At the same time the toggle action causes the switch 45 to be closed by movement of the rod 58 which engages the operating button 59, thereby energizing the solenoid 41 to open the valve 36 and to return the carriage and generator rearwardly to the initial starting position, as before mentioned, whereupon the lever 54 actuates the switch 44, thereby deenergizing both solenoids and permitting the electrodes 12 and 13 to drop over the next succeeding pair or group of work pieces and to follow the movement of the belt during the heating cycle as the carriage is moved by engagement of one of the studs 32 with the bar 31, as hereinbefore described.

It will be appreciated that the spacing of the work coils 12 and 13 and the distance of movement of the electrodes along the production line for each heating cycle, will depend upon the spacing of the articles, generally in abutting relation, as shown, and the speed of the production line with respect to the time required for the heating operation. Generally, however, the heating operation is substantially instantaneous and requires at most only a few seconds, so that the system may be used for the multiple heating of relatively small articles on a relatively rapidly moving conveyor line without difficulty.

Any suitable means other than the air controlled cylinder may be used for effecting the rapid return of the electrodes to their initial starting position. However, the cylinder and air control are formed to be effective for this purpose and may readily provide proper timing of the movement of the electrodes on the return stroke and a guiding control whereby the coils are brought into registration with the work elements at the proper time and position to be placed thereover for initiating the new heating cycle.

Furthermore, while any suitable means may be provided for carrying the heating coils or electrodes, the relatively small size of modern high frequency generators makes it possible to connect the coils directly thereto, whereby as shown, the generator and coils may be moved as a unit. As hereinbefore pointed out, however, the casing 17 operates as a carrier for the work coils, and the generator, per se, may be located at any desired point remotely, particularly where high power is employed and the generator may be of relatively large proportions.

It will be seen that a conveyor system embodying the invention is applicable wherever the work must move continuously while an induction heating operation is performed which requires that the work and the coil maintain fixed positions with relation to each other to present the heat application to a localized area on the work piece for a predetermined time. By so doing, a considerable amount of energy is conserved which would otherwise be utilized in heating the work piece outside of the desired area. This, together with the fact that the production line may be maintained in continuous uninterrupted operation, by having the heating means (i. e. the coil) move with the conveyor and workpieces during the heating action and be then returned to the starting point in order to repeat the cycle as described, are among the advantages provided by a heating system embodying the invention. In the present preferred embodiment shown, the movable induction heating unit provides for a series of articles or work pieces to be heated simultaneously while moving continuously through a production line at the desired production speed, and includes a simple, unitary work coil or electrodal arrangement which may be connected with and be moved intermittently along the production line in registration with the work at one or a plurality of points.

I claim as my invention:

1. An induction heating system for conveyor lines and the like, comprising in combination, a work coil, a carrier for the coil, means for imparting movement to the carrier and coil with and in the direction of movement of the work in a conveyor line, control means for moving said coil into and out of registration with the work at predetermined spaced points in the travel of said carrier to effect a localized induction heating operation thereon while in motion, and means for alternately imparting a return movement to the carrier and coil between said points for repeating said heating operation in connection with successive portions of the work.

2. An induction heating system for conveyor lines and the like, comprising in combination, a high frequency generator, a work coil rigidly connected with said generator, a carrier for the coil and generator as a unit, means including a releasable conveyor line connection for imparting movement to the carrier to move the coil and generator unit with and in the direction of movement of the work in a conveyor line, electrical control means for moving said generator and coil unit to carry said coil into and out of registration with the work at predetermined spaced points in the travel of said carrier to effect a localized induction heating operation thereon while in motion, and means responsive to movement of the coil out of engagement with the work for alternately imparting a return movement to the carrier and coil between said points for repeating said heating operation in connection with successive portions of the work.

3. An induction heating system for processing successive work pieces in a continuously moving line, comprising in combination, a work coil unit adapted to apply localized inductive heating to said work pieces, a carrier for said unit movable along said line between an initial starting point and an advanced point along the line in predetermined spaced relation thereto, a control element on the carrier for moving the work coil into and out of registration with a predetermined number of work pieces, means for moving the carrier and work coil unit at the speed of travel of the line from the initial point to the advanced point, means for returning said carrier and work coil unit from said advanced point rearwardly to the initial position at a predetermined higher speed.

4. An induction heating system for processing successive work pieces in a continuously moving line, comprising in combination, a work coil unit adapted to apply localized inductive heating to a plurality of said work pieces simultaneously, a carrier for said unit movable along said line between an initial starting point and an advanced point along the line in predetermined spaced relation thereto, a control element on the carrier for moving the work coil unit into and out of registration with a predetermined number of work pieces, electrically controlled means responsive to movement of the work coil unit out of registration with the work for returning said carrier and work coil unit from said advanced point rearwardly to the initial position at a predetermined higher speed, and means responsive to movement of the carrier to said initial point and said advanced point for actuating said control element to move the work coil into registration with the work at the initial point and out of registration therewith at the advanced point.

5. An induction heating conveyor system, comprising in combination, a conveyor for moving a succession of uniformly spaced production articles at substantially constant speed, a carriage adapted to be engaged by and moved with the conveyor, a work coil unit movably mounted on the carriage to register with and heat a predetermined number of said articles while in motion over a predetermined distance, said unit having heating coil elements for localizing the heat application to each article, and control means responsive to movement of the carrier to the limit of said distance for withdrawing the work coil unit from registration with said articles and releasing and returning the unit and carriage rearwardly into registration with the same number of adjacent succeeding articles and reengagement of the carriage with the conveyor respectively, whereby the heating cycle is repeated.

6. An induction heating conveyor system comprising in combination, a conveyor for moving a succession of uniformly spaced production articles at substantially constant speed, a carriage movable between an initial starting point and an advanced point in spaced relation thereto along the conveyor, a high frequency generator housing on said carriage, a pair of high frequency supply conductors extending from said housing outwardly over the conveyor and terminating in a plurality of rigid series connected work coils formed to apply heat to localized areas of a corresponding number of said articles, control means for moving said generator housing to carry work coils into effective heating relation with said localized areas of said articles at the initial point and out of such heating relation therewith at the advanced point of travel of the carriage, whereby a predetermined heating operation is effected in connection with said articles while in motion, means providing a releasable connection between the carriage and the conveyor for moving the carriage, housing and work coils with the conveyor from the initial point to the advanced point, operating means connected with and responsive to movement of the carriage to said advanced point for actuating said first named control means to withdraw the work coils from said articles and for releasing and moving the carriage rearwardly of the conveyor from the advanced point to the initial point at a speed in excess of that of the conveyor, and responsive to movement of the carriage to the initial point for actuating the first named control means to effect reestablishment of the said heating relation between the work coils and successive articles on the conveyor and connection between the carriage and the conveyor, whereby the operating cycle is repeated.

7. An induction heating conveyor system as defined by claim 6, wherein the generator casing includes a high frequency generator connected with said supply conductors for energizing said work coils, and the control means includes a limit switch operable by the carriage when in the initial and the advanced positions and a solenoid controlled thereby for moving said generator casing with respect to the carriage to control the application of the work coils to said articles, and wherein the carriage is provided with motor means for withdrawing it to the initial position including an air cylinder having a piston connected therewith and a solenoid controlled valve connected with said limit switch to be actuated thereby.

GURDON H. WILLIAMS.

REFERENCES CITED

The following references are of record in the file of this patent:

UNITED STATES PATENTS

| Number | Name | Date |
| --- | --- | --- |
| 2,288,644 | Purtell | July 7, 1942 |
| 2,385,904 | Witty | Oct. 2, 1945 |